United States Patent [19]

Curtin

[11] 3,857,588
[45] Dec. 31, 1974

[54] PIPE COUPLING
[76] Inventor: Hoyt S. Curtin, 104 Laramie Ave., Chatsworth, Calif. 91311
[22] Filed: Feb. 5, 1973
[21] Appl. No.: 329,727

[52] U.S. Cl................ 285/31, 285/93, 285/226, 285/235, 285/419, 285/DIG. 16, 285/DIG. 22, 285/423
[51] Int. Cl................ F16l 13/10, F16l 47/00
[58] Field of Search........ 285/31, 32, DIG. 16, 423, 285/21, 22, 417, 369, 284, 382.7, 384, 353

[56] References Cited
UNITED STATES PATENTS

| 2,503,826 | 4/1950 | Lamont | 285/384 X |
| 2,613,959 | 10/1952 | Richardson | 285/382.7 X |
| 2,933,428 | 4/1960 | Mueller | 285/21 X |
| 3,254,650 | 6/1966 | Collito | 285/DIG. 16 |
| 3,781,041 | 12/1973 | Petzetakis | 285/DIG. 16 |

FOREIGN PATENTS OR APPLICATIONS

| 340,074 | 12/1930 | Great Britain | 285/343 |
| 896,767 | 5/1962 | Great Britain | 285/343 |
| 1,963,299 | 6/1970 | Germany | 285/31 |
| 50,779 | 10/1935 | Denmark | 285/341 |
| 508,402 | 6/1939 | Great Britain | 285/31 |

Primary Examiner—Thomas F. Callaghan
Attorney, Agent, or Firm—Lindenberg, Freilich, Wasserman, Rosen & Fernandez

[57] ABSTRACT

A coupling for unthreaded pipes of a sprinkler system, which permits the replacement of a small damaged pipe section without bending the pipes already emplaced in the ground. One coupling includes a pair of end caps that can be installed on the ends of pipes that are to be joined, each cap having a short tubular portion for interfitting the tubular portion of the other cap, and also including a sleeve which can slide over both end caps to securely hold them in alignment.

6 Claims, 13 Drawing Figures

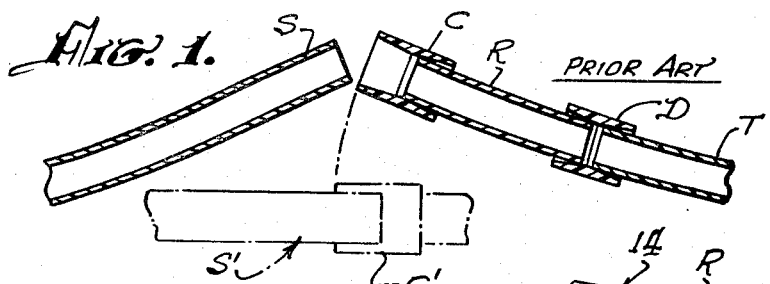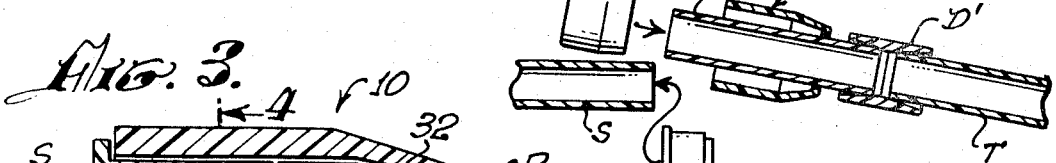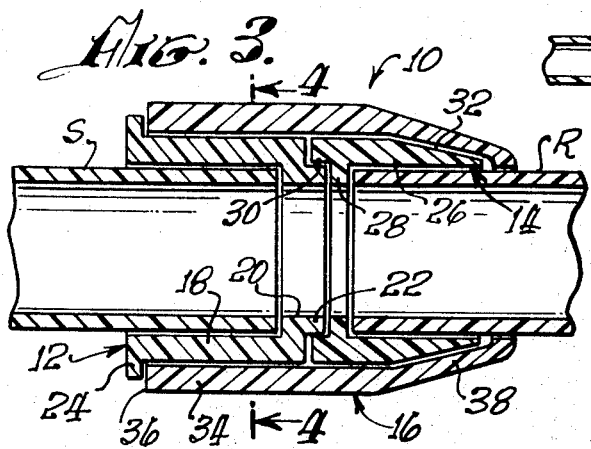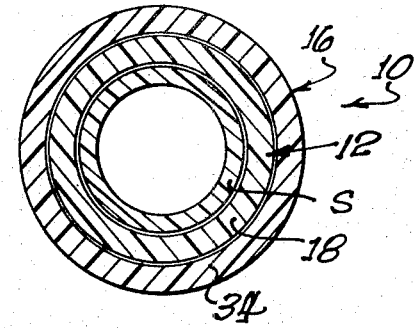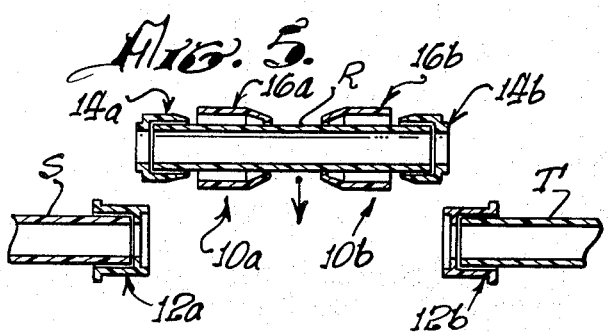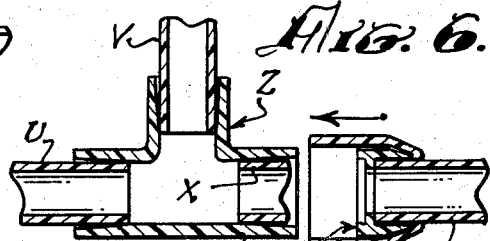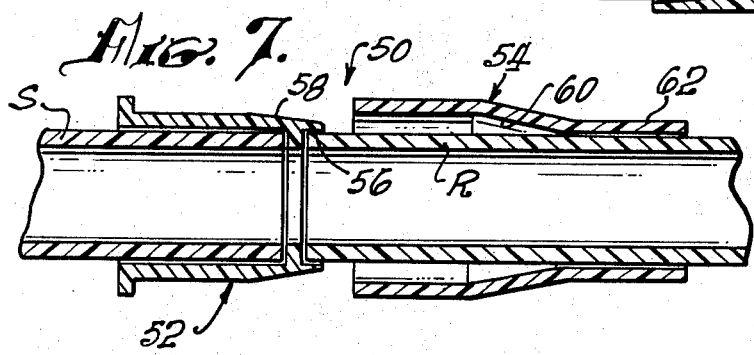

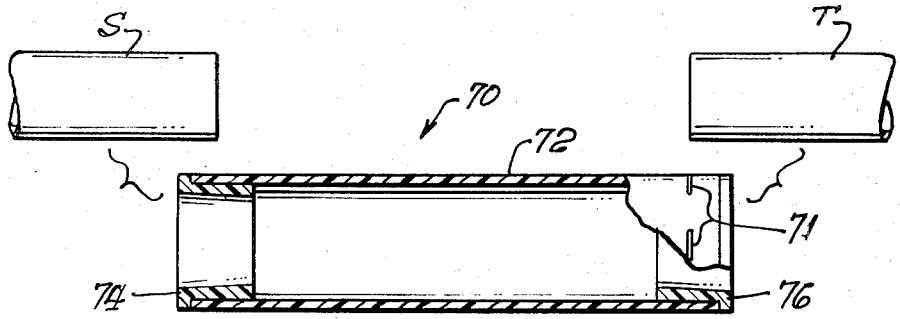
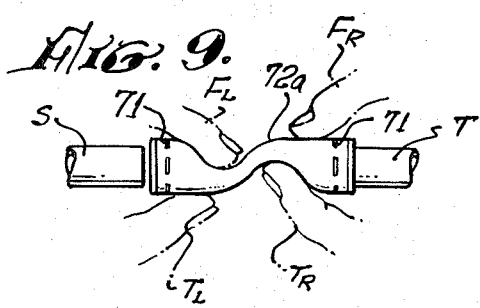
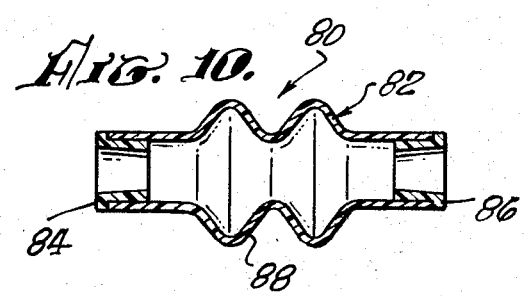
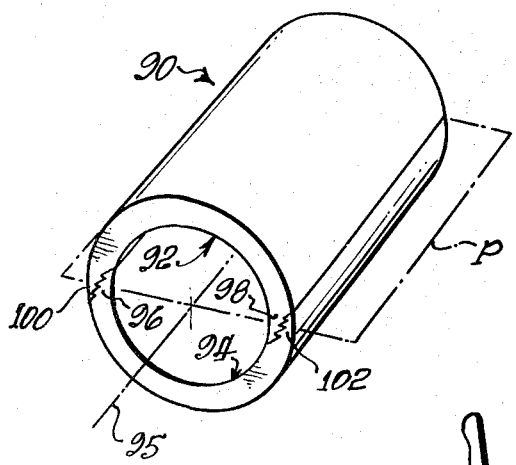
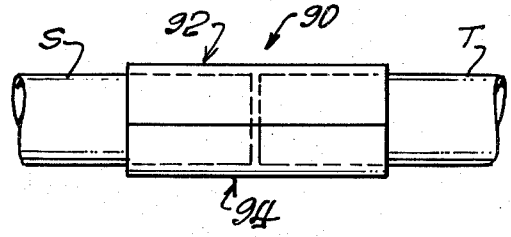
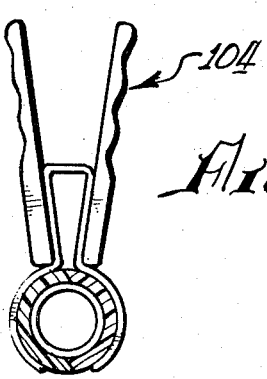

PIPE COUPLING

BACKGROUND OF THE INVENTION

This invention relates to pipe couplings, and more particularly to pipe couplings that are useable with unthreaded pipes.

Plastic pipes have become widely used in sprinkler systems because of their low cost and ease of connection and repair. Such pipes, commonly referred to as PVC because of their typical polyvinyl chloride composition, may be joined without threading by applying an adhesive such as a solvent cement type to the ends of the pipes and slipping a smooth-bore coupling over the ends.

When a break occurs in an underground sprinkler system of the PVC type, it can be repaired by digging away the dirt over the break, cutting out a small section of pipe containing the break, and connecting a new section of pipe in place using a pair of couplings. In practice, however, great difficulty is encountered in installing the couplings. The couplings can be installed by bending the pipe in the ground far enough so that the gap between them is increased sufficiently to insert the pipes into the couplings, and then releasing the bent pipes so they return to their original straight configuration. However, the dirt around a long section of the pipes may have to be removed to permit sufficient bending, which involves considerable labor and which may not be possible in certain locations. Also, the glue on the pipe may be scraped away while the pipe is fitted into the coupling. A coupling which could be installed without requiring large amounts of pipe bending would facilitate repairs in such sprinkler systems.

SUMMARY OF THE INVENTION

In accordance with one embodiment of the present invention, a pipe coupling is provided for use with unthreaded pipes, which provides a reliable connection without requiring excessive bending of pipes that are fixed in position in the ground. The coupling includes a pair of end caps that can be installed on two pipe ends that are to be joined, and a sleeve which can be slipped around the two end caps to securely hold them in alignment. Each of the end caps has a flange for abutting an end of its respective pipe and a very short tubular portion extending beyond the flange. The short tubular portion of one cap is received in and overlaps (on the order of 1/64th of an inch) the tubular portion of the other cap to help hold them in alignment. The sleeve has a length approximately equal to the combined lengths of the two caps, and it closely fits around the two caps to hold them together. One of the end caps is tapered along its rear portion, and the sleeve is tapered in a complementary manner to closely fit it. Each cap is installed with solvent cement, and the cement is applied around each of the caps to securely hold the sleeve in position.

In another coupling of the invention, a flexible coupling sleeve is provided which has rigid inserts at either end. The sleeve is of a flexible material such as a vinyl with plasticizer. Such a material may require considerable time such as hours to form a solvent cement bond with the more rigid PVC material containing less plasticizer which is typically used in sprinkler system pipes. The inserts are of the more rigid PVC material and can be bonded by solvent cement to typical sprinkler pipes in a short period of time such as less than 20 minutes. The coupling is installed by bending the sleeve thereof considerably so that no bending of the emplaced pipes is required. Even greater flexibility can be obtained by utilizing a flexible sleeve which is formed as a bellows. In still another embodiment of the invention, a coupling is provided which is formed from two half-cylindrical sections that can be brought together while their ends receive the ends of pipes to be coupled. Each section has saw toothed edges so that the parts tend to hold themselves in place while cement applied thereto is drying.

The novel features of the invention are set forth with particularity in the appended claims. The invention will best be understood from the following description when read in conjunction with the accompanying drawings.

BRIEF DESCRIPTION OF THE DRAWINGS

FIG. 1 is a sectional side view of a pipe and coupling of the prior art, showing how the coupling was installed in the prior art;

FIG. 2 is a sectional side view of a pipe coupling constructed in accordance with one embodiment of the present invention, showing the manner of installation in a pipe system;

FIG. 3 is a sectional side view of the coupling of FIG. 2, showing it completely installed on the pipe system;

FIG. 4 is a view taken on the line 4—4 of FIG. 3;

FIG. 5 is a sectional side view of an assembly constructed in accordance with the coupling of FIG. 3, but showing installation in a situation where substantially no bending of the emplaced pipes is possible;

FIG. 6 is a sectional side view of a portion of the coupling of FIG. 3, showint its employment in connection with a T-connector that has a broken pipe end loged therein; and FIG. 7 is a sectional side view of a pipe coupling constructed in accordance with another embodiment of the invention.

FIG. 8 is a sectional side view of a coupling constructed in accordance with still another embodiment of the invention;

FIG. 9 is a side elevation view of the coupling of FIG. 8, showing the manner in which it is installed on a pipe line;

FIG. 10 is a sectional side view of a coupling constructed in accordance with yet another embodiment of the invention;

FIG. 11 is a perspective view of a coupling constructed in accordance with yet another embodiment of the invention;

FIG. 12 is a side elevation view of the coupling of FIG. 11, showing it installed in a pipe line; and FIG. 13 is a sectional end view of the coupling of FIG. 11, showing how a clamp is applied to hold it together while cement thereon is drying.

DESCRIPTION OF THE PREFERRED EMBODIMENTS

FIG. 1 illustrates a pair of couplings C and D of the prior art, showing how they are used to connect a replacement pipe section R to the ends of a pair of pipes S and T. This is accomplished by installing the coupling D to connect the two pipes R and T, and installing the other coupling C over an end of the pipe R, as shown.

The mating surfaces of the couplings and pipes are made watertight by applying a suitable solvent cement thereto prior to insertion of the pipe ends into the couplings. Solvent cement is applied to the end of pipe S and to the interior of the free end of coupling C as illustrated in the figure. Considerable bending of the two pipes S and T is required to separate them sufficiently to permit insertion of the pipe S into the coupling C. Thereafter, the pipes are straightened to the position at S' and C'. As a result of the bending and straightening, the pipes and couplings are somewhat distorted, thereby reducing the strength of the ultimate bond. In sprinkler systems wherein the pipes S and T were in the ground, considerable soil had to be removed to permit the required amount of bending.

FIG. 2 illustrates the coupling 10 of the present invention, which employs a forward end cap 12 that fits over the end of one pipe S, a rearward end cap 14 that fits over the end of another pipe R, and a sleeve 16 that can fit around the two end caps 12, 14 to securely hold them in alignment and therefore securely couple the pipes. The replacement pipe section R may be first connected to one pipe T with an ordinary coupling D, and the coupling assembly 10 of the present invention then may be used to connect the other end of the pipe R. Only a small amount of bending of one or both pipes S, T is required in order to install the first coupling D and to install the end caps and sleeve of the coupling assembly 10. The amount of bending required in the embodiment of FIG. 2 is much less than required in the prior art, so that very little, if any, additional soil must be removed around the pipes S, T to make a repair.

FIG. 3 illustrates details of the coupling assembly 10. The forward end cap 12 has a pipe portion 18 with an inside diameter slightly greater than the diameter of the pipe S, to fit snugly around the end of the pipe. The cap 12 also has an inwardly-extending flange 20 that abuts the end of the pipe S to determine the position of the cap on the pipe, and a short tubular portion 22 that extends rearwardly beyond the pipe S and the flange 20. The cap 12 further has an outwardly extending flange 24 at its forward end. The rearward cap 14 also has a pipe portion 26 that closely surrounds the pipe R, an inwardly-extending flange 28 at its forward end that abuts the end of the pipe R, and a short tubular portion 30 that extends forwardly beyond the pipe R and beyond the flange 28. The tubular portions 22, 30 of the two ends caps are constructed to closely interfit, the tubular portion 22 of the forward cap being closely received in the tubular portion 30 of the rearward cap for alignment. It also may be noted that the rearward portion of the rearward cap is tapered at 32 on its outside.

The sleeve 16 has a length approximately equal to the combined lengths of the two end caps 12, 14, and it is designed to closely fit over them. The sleeve has a pipe portion 34 along most of its length that is closely received around the two end caps, and with a forward end 36 that nearly abuts the flange 24 on the forward cap. The sleeve also has a rearward portion 38 that is tapered along its inside to closely fit the tapered rearward portion 32 of the rearward cap.

The coupling assembly 10 is installed by first applying adhesive, such as a solvent cement, to the inside surfaces of the sleeve 16, and then slipping the sleeve onto the pipe R as illustrated in FIG. 2. No glue touches pipe R at this time. Adhesive is then applied to the ends of the pipes S and R, and the two end caps 12, 14 are then installed on the ends of their respective pipes S, R. The adhesive is then applied on the outside of the two caps 12, 14, except on the outside of the forward flange 24 of the forward cap. The short tubular portion 22 of the forward cap is inserted into the short tubular portion 30 of the rearward cap, which is easily done because of the short length of these tubular portions (their overlap is on the order of 1/64th inch). The sleeve 16 is then slid over the two end caps to the position illustrated in FIG. 3. The sleeve 16 is slid forwardly as far as possible, and is normally stopped by engagement of the tapered portions 32, 38 of the rearward cap and sleeve. It should be noted that the gluing surfaces are aligned and undistorted prior to sliding the sleeve 16 over the caps 12, 14.

The coupling assembly 10 provides a reliable pipe connection, because all parts are held along a considerable tubular length. Thus, the pipe portions 18, 26 of the two end caps are joined to their respective pipes S, R along a considerable surface area while the sleeve 16 is joined to the two end caps along a considerable tubular area. Also, in order for water to leak out, it would have to pass along a considerable tubular area where adhesive holds the parts together. The interfitting short tubular portions 22, 30 also aid in sealing. It may be noted that the male tubular portion 22 may be formed on the rearward cap 14 and the female tubular portion formed on the forward cap 12, instead of visa versa, if desired.

FIG. 5 illustrates the manner in which two pipe couplings 10a and 10b of the present invention can be utilized in a situation where essentially no bending of the emplaced pipes S and T is possible. Instead of using one ordinary coupling D of the prior art as illustrated in FIG. 2, two couplings of the present invention are employed at the opposite ends of the replacement pipe R. The installation of FIG. 5 is made by installing two forward end caps 12a, 12b on the two pipes S and T. Two sleeves 16a and 16b are installed on the pipe R and two rearward end caps 14a, 14b are installed on the ends of the pipe section R. The pipe section R is then dropped into alignment with the two pipes S, T and the sleeves are then slid into position.

FIG. 6 illustrates how a portion of the coupling assembly of the invention can be utilized to connect a replacement pipe W to a T-coupling (or L-coupling) Z of the prior art. The coupling Z is shown with a pipe end X broken off inside. The installation is made by attaching a rearward end cap 14 to the replacement pipe W, moving the forward end of the cap 14 against the T-coupling Z, and then sliding the sleeve 16 over the rear cap 14 and an end P of the coupling Z. The coupling end P is of the same outside diameter as the rearward cap 14, so that the coupling 16 is closely received thereon. Thus, the same coupling assembly can be utilized to connect to a T-coupling of the prior art, by eliminating the forward end cap.

FIG. 7 illustrates a coupling assembly 50 constructed in accordance with another pipe R. of the invention, which utilizes only one end cap 52 and a sleeve 54. The cap 52 is similar to the forward end cap of the assembly 10, except that it has a female tubular portion 56 at its rearward end for directly receiving the end of the pipe R. Also, the cap 52 is tapered along the outside of its rearward portion 58. The sleeve 54 is similar to the sleeve of the coupling assembly 10, except that the taper at 60 occurs along a middle portion, and the rearward portion 62 is formed to closely receive the pipeR. The installation of the coupling assembly 50 is accomplished by applying adhesive to the inner surface of sleeve 54 and sliding the sleeve 54 over the pipe R. Adhesive is then applied around the ends of the pipe S. The end cap 52 is then installed on the end of the pipe S and with its tubular portion 56 receiving the end of the pipe R. Adhesive is then applied to the outside of cap 52 and pipe R, and the sleeve 54 is then slid forwardly over the cap 52.

FIGS. 8 and 9 illustrate a coupling 70 constructed in accordance with a further embodiment of the invention, which utilizes a highly flexible sleeve 72 and a pair of substantially rigid inserts 74, 76 at the ends of the sleeves. The sleeve 72 has sufficient flexibility so that it can be readily deformed by a person to the configuration illustrated in FIG. 9, to thereby shorten the length between the ends of the coupling. A variety of materials such as a vinyl with considerable plasticizer can be utilized to achieve much flexibility. The sleeve 72 cannot be readily used alone because solvent cement, which is the most commonly type utilized in PVC sprinkler piper repair, requires considerable time to bond to suitable highly flexible material. While the common more rigid PVC pipes can be bonded together with solvent cement in a time less than about 20 minutes, bonding of such rigid PVC to the highly flexible vinyl can require hours. The inserts 74, 76 minimize the bonding time, inasmuch as the inserts are constructed of ordinary rigid PVC. Also, the inserts are internally tapered to facilitate joining to another pipe. The inserts 74, 76 are installed, as with solvent cement, at the factory so that the longer bonding time is not a highly significant factor. A repairman installs the coupling 70 to replace a damaged pipe section, by cutting out the damaged section to leave two pipe ends S and T. The coupling 70 is provided with markings 71 near either end thereof to serve as a gauge that indicated the required gap length. The repairman coats the ends of the pipe S and T and the insides of the inserts 74, 76 with solvent cement and then inserts one pipe T into one insert 76. He then deforms the sleeve 72 as to the configuration illustrated at 72a in FIG. 9 with his thumbs $T_r$ and $T_L$ and forefingers $F_r$ and $F_L$ to reduce the length of the coupling. The shortened coupling can then be inserted into the other pipe S and allowed to return to its cylindrical shape, so that it becomes longer while receiving the other pipe end S.

FIG. 10 illustrates a coupling 80 constructed in accordance with yet another embodiment of the invention, wherein a flexible sleeve 82 is utilized in conjunction with end inserts 84, 86 of harder material, in which the flexible sleeve is formed with a bellows portion 88. The flexible sleeve and inserts are of material similar to those described in the coupling of FIGS. 8 and 9. The bellows portion 80 makes compression of the length of the sleeve even easier.

FIGS. 11-13 illustrate a still further embodiment of the invention, wherein the coupling 90 includes a pair of half-cylindrical parts 92, 94 that can be fitted together over the ends of pipes S, T. The two parts 92, 94 are identical, and each extend slightly more than 180° and has serrated sides 96, 98 or 100, 102. Each part 92, 94 is substantially one of the halves of a pipe cut along an imaginary plane P that extends through the axis 95 of the pipe. The serrated sides of the two parts interfit and serve to hold the parts together while solvent cement dries thereon. Both parts may be constructed of an ordinary largely rigid vinyl that can be rapidly solvently cemented to PVC pipes. The coupling 90 is installed by applying solvent cement to the serrated sides 96-102 of the half-cylindrical parts, as well as to the inside surfaces thereof and to the outside surfaces of the ends of the pipes S and T. The two coupling parts 92, 94 are then placed on opposite sides of the pipes and pressed together so that their serrated sides 98-102 interfit. The coupling parts can be even more securely held together by means of a clamp 104 illustrated in FIG. 13 which is removed after the solvent cement has at least partially dried.

Thus, the invention provides a pipe coupling assembly for installation on unthreaded pipes of the type that are readily joinable with adhesive such as the solvent type, which can be installed with very little bending of the pipes. This can be accomplished by utilizing at least one end cap that fits over an end of a pipe, and a sleeve that surrounds the ends of the two pipes. In one embodiment of the invention, two end caps are utilized which have short tubular portions that are received in one another, and the sleeve is closely received around the outsides of the two end caps. In another embodiment of the invention, a single end cap is utilized which has a long pipe portion received on one pipe end and which has a very short tubular portion which receives the end of the other pipe. The sleeve has a large diameter forward portion which closely receives the end cap, and a smaller rearward portion that closely receives that pipe which has no end cap thereon. Another type of coupling utilizes a flexible coupling sleeve with ends inserts of harder material that more readily bonds to the pipes. Still another coupling utilizes semi-cylindrical coupling parts that are brought together over the pipe ends that are to be joined.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A pipe coupling for first and second pipes of predetermined size, comprising:
   a first end cap with a pipe portion that has an inside diameter slightly larger than the pipe diameter for adhesive mounting on the end of the first pipe, and with an inwardly-extending flange for abutting the end of the first pipe to determine the position of the cap thereon;
   a sleeve slideable along its entire length along said second pipe and having a forward end with an inside diameter slightly larger than an outer diameter portion of the cap for sliding thereover, said sleeve having means for limiting sliding thereof towards said cap so that a rearward end portion of the sleeve extends rearwardly of the end cap and around said second pipe; and
   a second end cap for adhesive mounting on an end of the second pipe opposite the first end cap, said second cap having an inwardly-extending flange for abutting the end of the second pipe to determine the position of the second cap thereon;
   each of said caps having a short tubular portion extending beyond the flange thereof, with the tubular portion of one cap receivable in the tubular portion of the other;

said first end cap having a predetermined first outside diameter along most of its length, said second end cap having a forward portion of said predetermined first diameter and a rearward portion tapered to increasingly smaller outside diameters at increasingly rearward locations thereof;

said sleeve having a substantially smooth internal surface with a forward portion slightly greater than said predetermined first outside diameter and a rearward portion tapered complementary to said rearward portion of said second cap for axial sliding movement of said sleeve over said caps for adhesive securement thereto, said sleeve having a substantially smooth external surface free of securing means.

2. The pipe coupling described in claim 1 wherein: the rearward end portion of said sleeve closely slidingly fits the second pipe.

3. In a pipe joint that includes first and second pipes with their ends unthreaded and aligned and spaced apart, the improvement comprsing:

a first end cap mounted on the end of the first pipe, said cap having a forward portion closely surrounding the pipe and a rearward portion with an inwardly-extending flange abutting the pipe end, said first end cap adhesively mounted on the first pipe;

a sleeve slideable along its entire length along said second pipe when not adhesively fixed in place, with said sleeve having a substantially smooth internal surface with a forward portion closely surrounding said first end cap and adhesively joined thereto, and having a rearward portion surrounding said second pipe and fixed in position thereat; and a second end cap mounted on the end of the second pipe, said second cap having a rearward portion closely surrounding the second pipe and a forward portion with an inwardly-extending flange abutting the end of the second pipe, said second end cap adhesively mounted on the second pipe;

each of said end caps having a short tubular portion extending beyond the end of its respective pipe, one of said tubular portions being slightly greater in internal diameter than the external diameter of the other tubular portion to closely receive it;

said sleeve rearward portion closely surrounding and adhesively joined to said second end cap;

said second end cap having a rearward portion tapered on the outside thereof so it has a progressively smaller outside diameter at progressively more rearward locations, said sleeve having an internal tapered rearward portion closely engaging the tapered rearward portion of the second end cap said sleeve having a substantially smooth external surface free of securing means.

4. The improvement described in claim 3 wherein: the first end cap has an outwardly extending flange positioned forward of the forward end of the sleeve.

5. A pipe coupling for first and second pipes of predetermined size, comrprising:

a tubular cap member having inner and outer surfaces, said inner surface having a diameter slightly larger than the outside diameter of said first pipe for adhesive mounting on said first pipe and including a flange projecting inwardly from said inner surface for abutting the end of said first pipe to position said cap member thereon, said member having a relatively short tubular portion extending beyond said flange for closely receiving the end of said second pipe whereby the end of said second pipe abuts said flange said outer surface including a first portion of substantially uniform diameter and a second portion tapered to define an increasingly larger diameter at increasing distances from one end of said cap member; and a tubular sleeve slideable along said second pipe and having a substantially smooth internal surface including a first portion having a diameter slightly larger than the diameter of said cap member outer surface first portion for axial sliding movement of said sleeve over said cap for adhesive mounting thereto, a second portion tapered complementary to said cap member outer surface second portion for adhesive mountin thereto and a third cylindrical portion having a diameter slightly larger than the outer surface of said second pipe for adhesively mounting thereto, said sleeve having a substantially smooth external surface free of securing means.

6. The coupling of claim 5 wherein said tubular cap member is comprised of first and second end caps aligned end to end.

* * * * *